(12) United States Patent
Vihriala

(10) Patent No.: US 10,797,930 B1
(45) Date of Patent: Oct. 6, 2020

(54) APPARATUS AND METHOD FOR DETECTION OF RECEIVED SIGNALS

(71) Applicant: Nokia Technologies Oy, Espoo (FI)

(72) Inventor: Jaakko Eino Ilmari Vihriala, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/689,227

(22) Filed: Nov. 20, 2019

(30) Foreign Application Priority Data

Jan. 30, 2019 (FI) .................................. 20195058

(51) Int. Cl.
*H04L 27/34* (2006.01)
*H04B 17/336* (2015.01)
*H04B 7/0413* (2017.01)
*H04L 27/26* (2006.01)

(52) U.S. Cl.
CPC ....... *H04L 27/3483* (2013.01); *H04B 7/0413* (2013.01); *H04B 17/336* (2015.01); *H04L 27/2605* (2013.01)

(58) Field of Classification Search
None
See application file for complete search history.

(56) References Cited

U.S. PATENT DOCUMENTS

| 8,238,488 B1* | 8/2012 | Lee .................... H04L 25/03331 375/262 |
| 8,411,806 B1* | 4/2013 | Lee .................... H04L 25/03305 375/340 |
| 2004/0242179 A1 | 12/2004 | Onggosanusi et al. |
| 2006/0256888 A1* | 11/2006 | Nissani (Nissensohn) .................. H04L 1/02 375/267 |
| 2017/0288747 A1 | 10/2017 | Chen et al. |

FOREIGN PATENT DOCUMENTS

EP        2597835 A2        5/2013

* cited by examiner

*Primary Examiner* — Alex Skripnikov
(74) *Attorney, Agent, or Firm* — Harrington & Smith

(57) ABSTRACT

The proposed solution includes storing for a given number of modulation methods, for each modulation symbol, information on neighboring symbols in the symbol constellation of the modulation method, receiving as an input a Multiple Input Multiple Output signal including modulation symbols in two or more layers; providing hard decisions of the modulation symbols for each layer; determining neighbors for each hard decision; for each hard decision of a layer, going through at least some of the neighbors and evaluating a cost function, selecting a symbol based on the evaluation and repeating this for each layer.

15 Claims, 7 Drawing Sheets

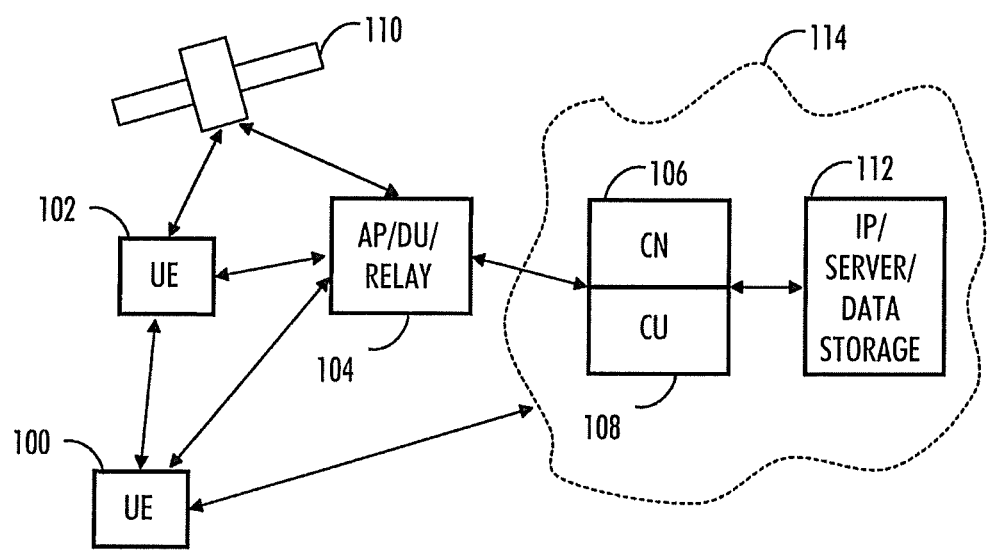
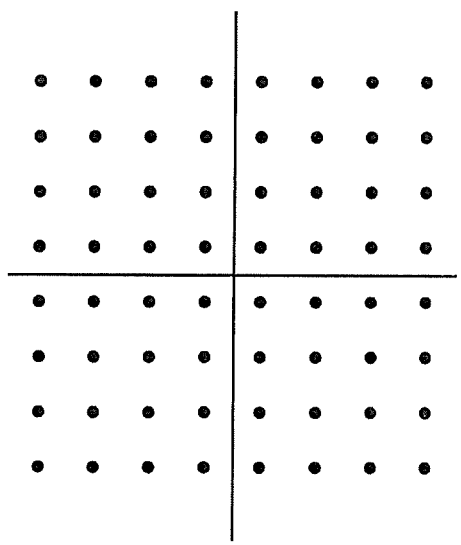
FIG. 2A
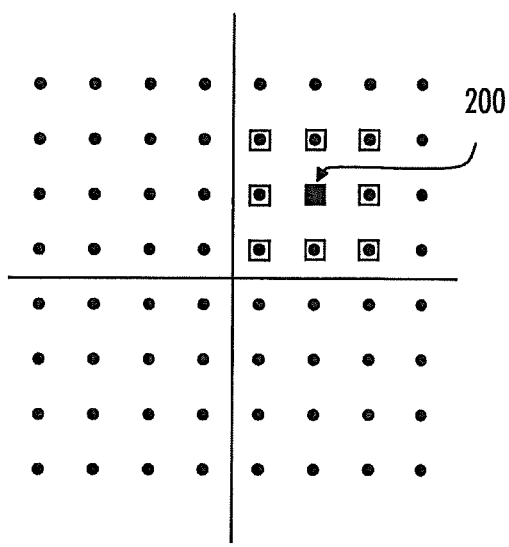
FIG. 2B

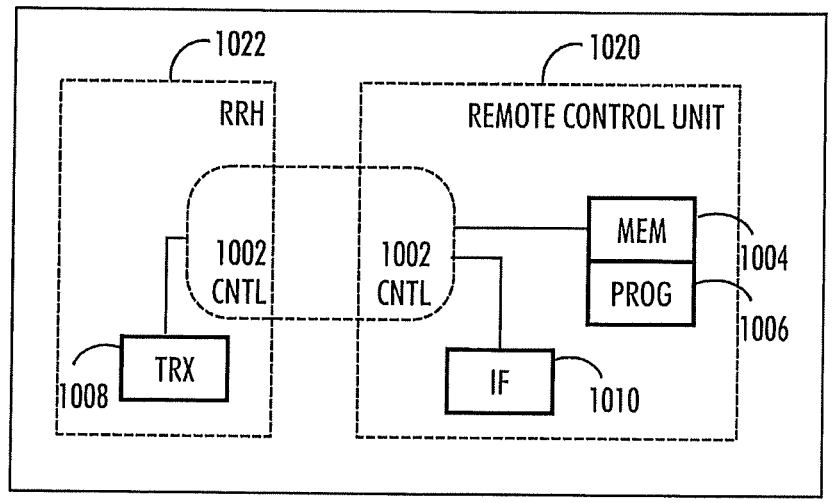
FIG. 10B
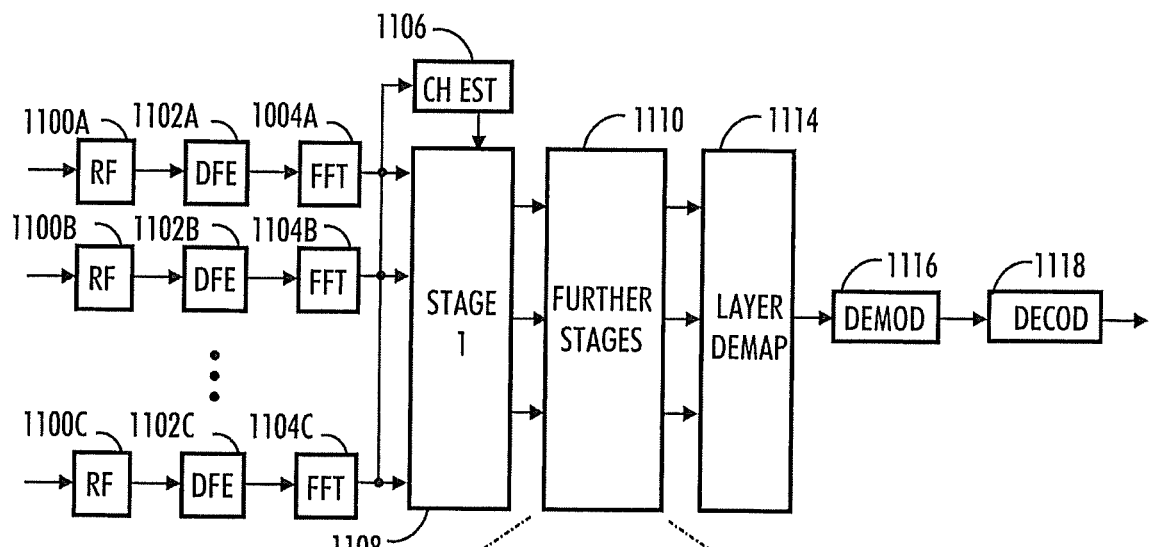
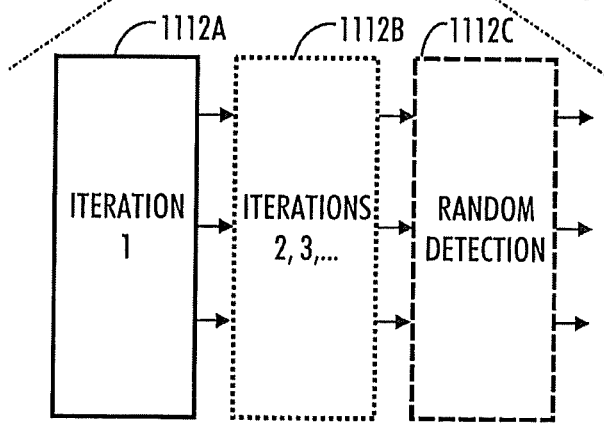
FIG. 10C

APPARATUS AND METHOD FOR DETECTION OF RECEIVED SIGNALS

TECHNICAL FIELD

The exemplary and non-limiting embodiments of the invention relate generally to communications.

BACKGROUND

Wireless telecommunication systems are under constant development. There is a constant need for higher data rates and high quality of service. Partly for these reasons the modern telecommunication systems, such as fifth generation, 5G, networks are moving towards millimeter-wave, mmW, frequencies to seek for wide spectrum access, which eventually enables extremely high data rates.

To achieve high capacity and data rate Multiple-input multiple-output, or MIMO, transmission has been studied. MIMO is a term that is used for a method of transmitting and receiving of more than one data signal simultaneously over the same radio channel. A base station or access point of a communication system may transmit using many antenna beams pointed in different directions instead of an omnidirectional transmission. Respectively a user terminal may utilize more than one antennas in reception and transmission of signals.

In MIMO transmission more than one symbols is transmitted at a same time. In the receiver, the task is to decode the received symbols. Various detectors have been proposed for decoding a MIMO signal. A Minimum mean square error, MMSE and Zero Forcing, ZF, MIMO detectors are relatively simple to realize but the performance is far from the optimal. On the other hand, maximum likelihood detection has a good performance but has a very high complexity. Several algorithms exist which provide a good performance, such as turbo equalizer and sphere detection. However, all of these suffer from very high complexity and latency.

BRIEF DESCRIPTION

According to an aspect of the present invention, there is provided an apparatuses of claim 1.

According to an aspect of the present invention, there is provided a method of claim 8.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the accompanying drawings, in which FIG. 1 illustrates a general architecture of an exemplary communication system;

FIGS. 2A and 2B illustrate examples of a constellation;

FIGS. 10A, 10B and 10C illustrate simplified examples of apparatuses applying some embodiments of the invention.

DETAILED DESCRIPTION OF SOME EMBODIMENTS

Figure 3:
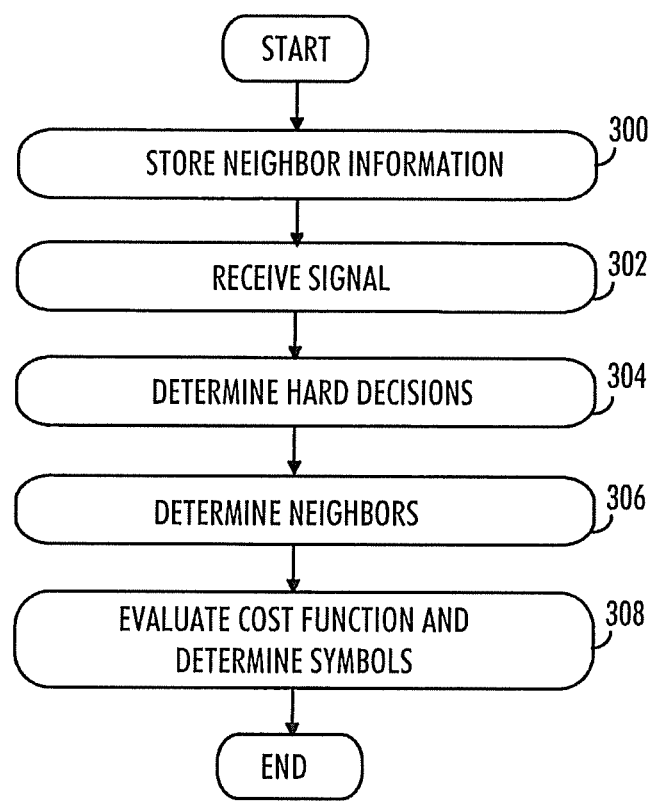
FIGS. 3 and 4 are flowcharts illustrating embodiments of the invention.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB or (e/g)NB) 104 providing the cell. The physical link from a user device to a (e/g)NodeB is called uplink or reverse link and the physical link from the (e/g) NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user device may also be a device having capability to operate utilizing enhanced machine-type communication (eMTC). The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, perhaps more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and mobile edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent.

Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNodeB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Nod Bs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large a number of HNBs back to a core network.

As mentioned, radio access network may be split into two logical entities called Central Unit (CU) and Distributed Unit (DU). In prior art, both CU and DU are supplied by the same vendor. Thus they are designed together and interworking between the units is easy. The interface between CU and DU is currently being standardized by 3GPP and it is denoted F1 interface. Therefore in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

The present solution relates to processing a signal received by a receiver or transceiver in a base station or a user terminal. The task of the receiver or transceiver is to decode the symbols the received signal comprises. The proposed solution relates especially to MIMO detection. Thus the signal has been transmitted utilizing more than one antenna or antenna element and also received likewise, utilizing more than one antenna or antenna element.

In general, the received signal may be expressed in form $$y=Hx+z,$$

where $H \in \mathbb{C}^{N_t \times N_r}$ is the effective channel matrix, $N_t$ and $N_r$ are the number of transmitter, Tx, and receiver, Rx, antennas, $x \in \mathbb{C}^{N_t}$ is the transmitted signal, and z is thermal noise. In an embodiment, elements in vector x may be modulated Quadrature Amplitude Modulation, QAM, symbols. Also other modulation methods may be used. This model is valid also when precoding is used in transmission. In such a case, H=GW in this case, where G is the "full" channel matrix, and W is the precoder. Therefore, $N_t$ can be understood as the number of spatial layers. As demodulation reference signal DMRS is precoded, the receiver estimates only H.

In digital modulation methods, a constellation may be used to illustrate possible symbols to be transmitted. FIG. 2A illustrates an example of a constellation, in this case the constellation of 64-QAM. In 64-QAM the constellation comprises 64 constellation points or symbols and one symbols may convey 6 bits of information.

FIG. 3 is a flowchart illustrating some embodiments of the invention. FIG. 3 illustrates an example of the operation of an apparatus which may be a base station or a user terminal or a part of a base station or a user terminal receiving a MIMO signal.

In step 300, the apparatus is configured to store, for a given number of modulation methods, for each modulation symbol, information on neighboring symbols in the symbol constellation of the modulation method. FIG. 2B illustrates an example. For symbol 200 the neighboring symbols are denoted with a square around the symbol. As the modulation method used in the connection between a base station (or eNodeB, gNodeB) and a user terminal, due to link adaptation, the apparatus may store data for each supported modulation method.

In step 302, the apparatus is configured to receive as an input a Multiple Input Multiple Output signal comprising modulation symbols in two or more layers. The number of layers depend on the number of antennas or antenna elements and link adaptation. Number of physical antennas set the maximum number of layers.

In step 304, the apparatus is configured to provide hard decisions of the modulation symbols for each layer. In an embodiment, the apparatus comprises a multistage receiver and the hard decisions are determined in the first stage of the receiver. Typically the first stage providing the hard decisions is a low complexity stage utilizing, a non-limiting for example, MMSE, ZF, or MMSE-IRC (Minimum mean square error-Interference rejection).

In step 306, the apparatus is configured to, for each layer, determine neighbors for each hard decision. In determining the neighbors the stored values may be utilized. For example, if the hard decision is the symbol 200 in FIG. 2B, the neighbors are the symbols denoted with squares.

In step 308, the apparatus is configured to, for each hard decision of a layer, go through at least some of the neighbors and evaluate a cost function and select the symbol based on the evaluation. In an embodiment, symbol that optimises the cost function may be selected. This procedure is repeated for each layer. In an embodiment, if the apparatus comprises a multistage receiver, this may be performed at a second stage of the receiver.

The procedure may be performed one layer at a time, by going through all neighbors. In the processing of a layer, the symbols of the other layers may be fixed to the hard decisions. All layers are gone through in this manner. In the end, the set of symbols which optimized the cost function, are selected.

In an embodiment, this procedure can be repeated by several iterations. The best hard symbols are the input to the next iteration.

Figure 4:
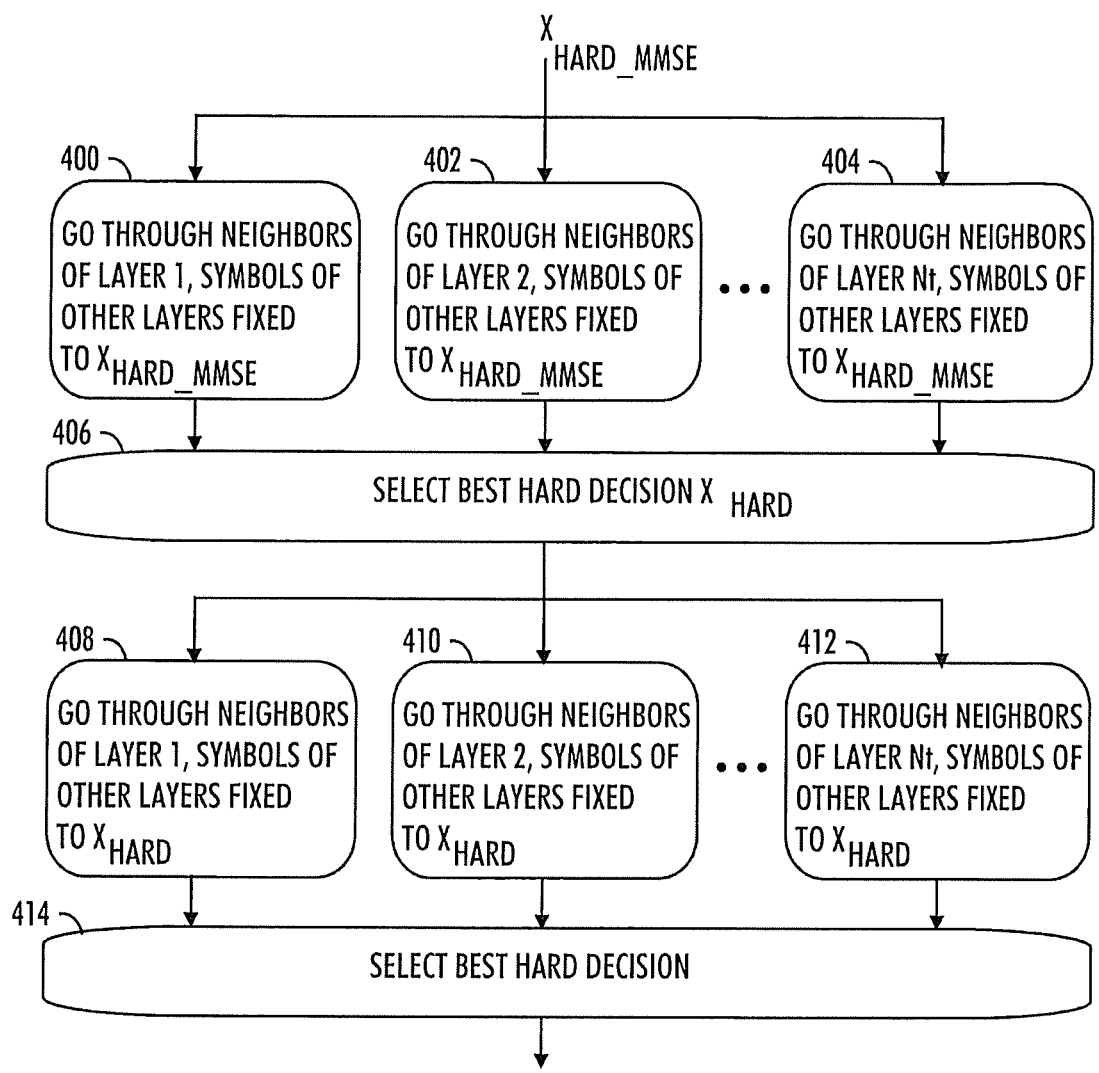

FIG. 4 is a flowchart illustrating some embodiments of the invention. FIG. 4 further illustrates an example of the operation of an apparatus which may be a base station or a user terminal or a part of a base station or a user terminal receiving a MIMO signal. The figure illustrates the operation of utilizing neighbors.

Input to the example of FIG. 4 is the hard symbols $x_{HARD:MMSE}$ obtained in the first stage of the receiver of the apparatus, in this example utilizing MMSE.

For each $N_t$ layers, go through 400, 402, 404 at least some of the neighbors of the hard decision and evaluate a predetermined cost function and select a symbol based on evaluation. The symbols of the other layers may be fixed to the hard decisions $x_{HARD:MMSE}$. In an embodiment, best symbols $x_{HARD}$ that optimize the cost function are selected 406 as output.

In an embodiment, a third stage is executed in a similar manner as the second stage, but in this case, when a layer is gone through 408, 410, 412, the starting point is the hard symbol $x_{HARD}$ and on other layers the symbols may as well be fixed to the hard decisions $x_{HARD}$.

In an embodiment, best symbols that optimize the cost function are selected 414 as output.

As mentioned above, the first stage providing the hard decisions may typically be a low complexity stage utilizing, a for example, MMSE, ZF, or MMSE-IRC.

Neighbor symbols for the symbols of the constellation may be stored in the memory of the apparatus. Let there be $N_t$ layers and the number of neighbors is $N_{neighbor}$. The purpose is to search the optimal set of hypothetic symbols among the $N_t \times N_{neighbor}$ possible hypothesis. In some embodiments it may be feasible to use joint decision with complexity $(N_{neighbor})^{N_t}$, but this has a higher complexity. In an optimal method, the complexity would be much higher: $2^{N_t \times log_2(M)=MN_t}$, where M is the modulation order (for 64-QAM, M=64, for example.

A cost function is used to select the best among the $N_t \times N_{neighbor}$ neighbor possibilities. One possible example is of a cost function is the squared norm compared to the received signal:

$$\Omega(x)=\|y-Hx_{hyp}\|^2$$

where y is the received vector of length $N_r$ and $x_{hyp}$ is the hypothesis of decisions.

After the best $x_{hyp}$ is found, it is possible to repeat the process over several iterations in later stages of receiver. In such case, the best $x_{hyp}$ are used as the input to the next iteration.

Figure 5A:
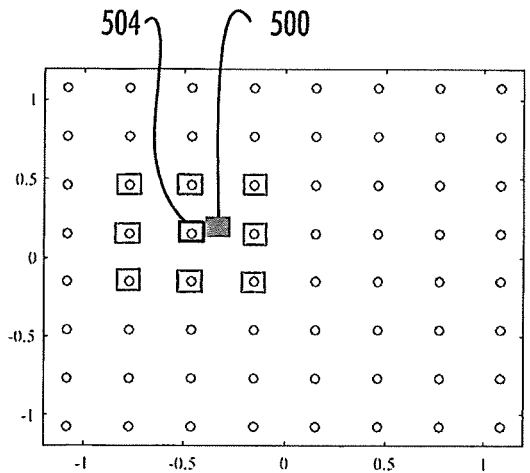
FIGS. 5A and 5B illustrate examples of utilizing neighboring symbols in a constellation.
Figure 5B:
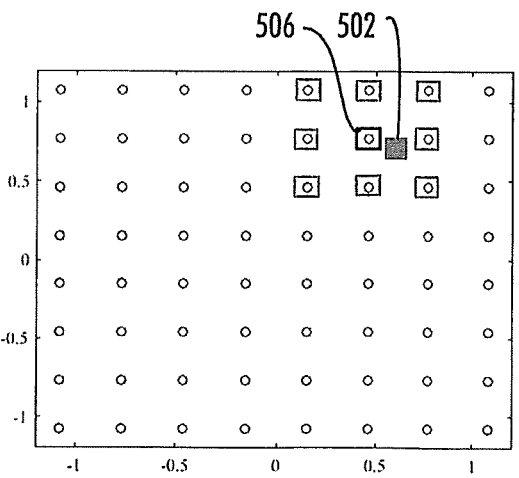

FIGS. 5A and 5B illustrate an example. Assume here a two layer transmission and 64-QAM as the modulation method. FIG. 5A illustrates first layer and FIG. 5B second layer. Solid squares denote estimated symbols from the first stage (using MMSE, for example). Black squares 504, 506 are the hard decisions. Eight grey squares around each hard decision are the neighbors to each hard decision. The cost function is evaluated using the neighbors and the hard decisions.

In an embodiment, as explained above, one layer at a time is processed. When processing layer 1, the symbol of layer 2 is fixed to the hard decision. Eight hypothesis are formed using the neighbors of hard decision of layer 1. Then the symbol of layer 1 is fixed to be the corresponding hard decision, and all eight candidates on layer 2 are evaluated. The cost function is evaluated $N_t \times N_{neighbor} = 2*8 = 16$ times. The symbols for layer 1 and layer 2 are selected which minimize or optimize the cost function.

Assuming $N_t = N_r$, the complexity of the cost function evaluation is $N_t^2$. With $N_{iter}$ iterations, the total number of cost function evaluations is $N_{iter} \times N_t \times N_{neighbor}$. Therefore, the total complexity of the baseline algorithm is $N_t^3 N_{iter} N_{neighbor}$.

The complexity of the proposed solution can be reduced by various ways. Examples of possible ways to reduce complexity are limiting the length of the neighbor list, reducing the number of iterations, a so called greedy search and by organizing the order in which the layers are processed (and possibly leaving some layers out).

Figure 6:
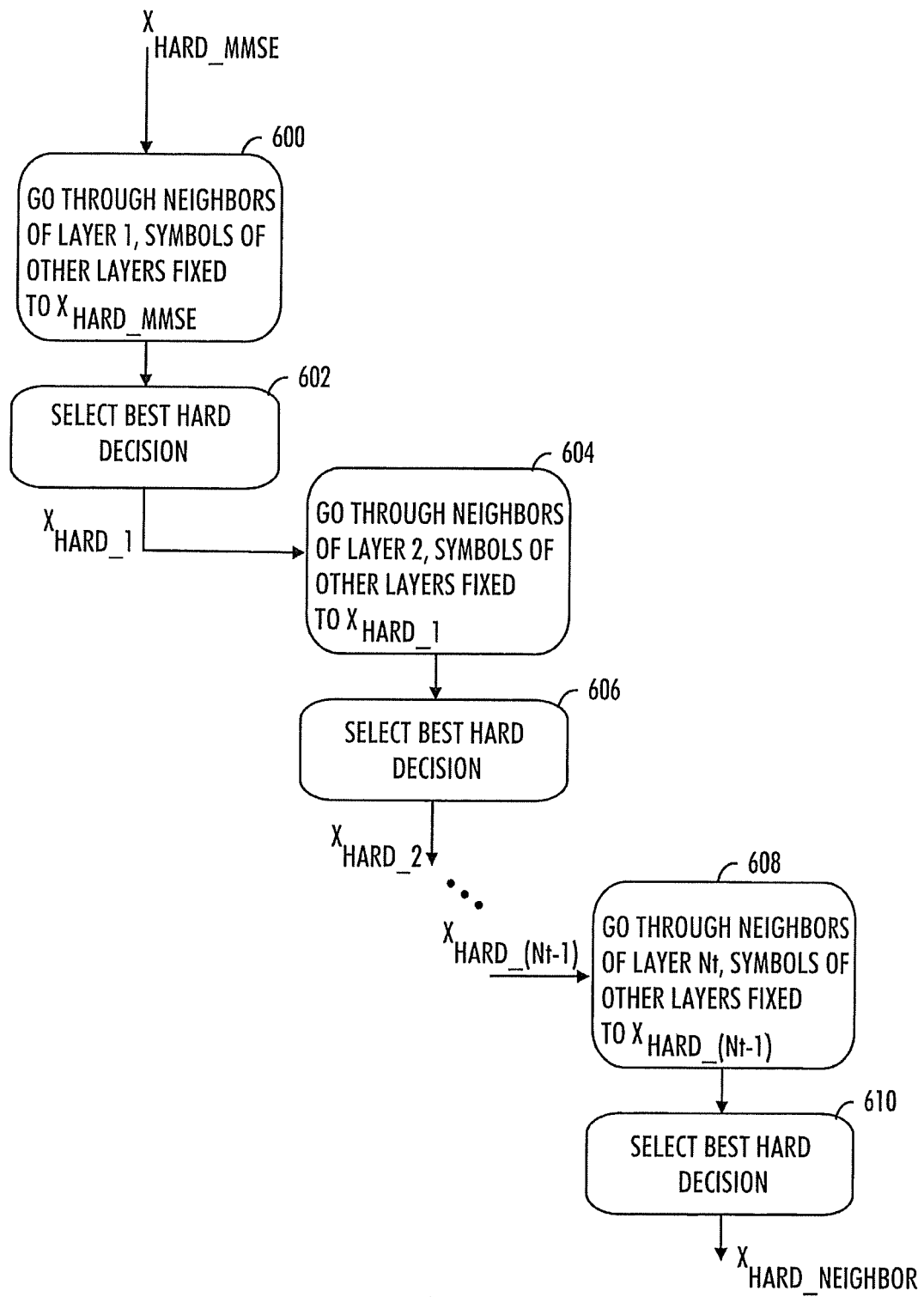
FIGS. 6 and 7 are flowcharts illustrating embodiments of the invention.

FIG. 6 illustrates an example of greedy search. Input to the example of FIG. 6 is the hard symbols $x_{HARD:MMSE}$ obtained in the first stage of the receiver of the apparatus, in this example utilizing MMSE.

First, for layer 1, at least some of the neighbors of the hard decision are gone through and a predetermined cost function is evaluated and those symbols that optimize the cost function are selected. The symbols of the other layers $2-N_t$ are fixed to the hard decisions $x_{HARD:MMSE}$. At the output is the vector $x_{HARD\_1}$. The selected 602 symbol for layer 1 comprises the best symbol that optimizes the cost function. Symbols of the other layers in the vector correspond to symbols $x_{HARD:MMSE}$.

Next, layer 2 is gone through 604 in a similar manner. As an input are the hard decisions $x_{HARD\_1}$. The symbol for layer 1 is fixed to the one selected in step 602, symbols of the other layers $3-N_t$ are fixed to the hard decisions $x_{HARD:MMSE}$.

Respectively all layers are gone through 608 and finally best hard decisions are obtained 610.

For selecting the order in which the layers are gone through, signal to noise ratio for each layer may be determined. The layers may be processed starting from the layer having the weakest signal to noise ratio towards the layer having the best signal to noise ratio.

In an embodiment, layers may be sorted based on some other criteria, such as user terminal priority in the case of Multi-user MIMO (MU-MIMO).

In an embodiment, the number of processed layers may be limited.

The number of neighbors may be limited. Simulations have showed that eight neighbors is sufficient for all cases, except for QPSK when only three is required.

Using the above methods, values for $N_{iter}$ and $N_{neighbor}$ can be decreased.

In an embodiment, further complexity reduction is possible in the evaluation of the cost function. For example, during the processing of the first layer, the symbols of the rest of the layers are fixed to the currently best known hard decisions (for example, the hard symbols formed from the MMSE symbols.) The cost function is $$\Omega(x)=\|y-Hx_{hyp}\|^2=\|y-\tilde{y}\|^2,$$

where $\tilde{y}=Hx_{hyp}$. During the processing of the first layer, we have $x_{hyp}=[x_{neighbour,1,i} \ x_2^{best} \ldots x_{N_t}^{best}]_T$, where i is the index of the ith neighbor of symbol 1. During the search of the neighbors, $x_2^{best} \ldots x_{N_t}^{best}$ stay fixed. Let $h_n=[h_{n,1} \ h_{n,2} \ldots h_{n,N_t}]$ be nth row of H. Now nth element of $\tilde{y}$ can be written as $$\tilde{y}_n = h_{n,1} x_{neighbour,1,i} + h_{n,2} x_2^{best} + \ldots + h_{n,N_t} x_{N_t}^{best},$$

where i goes through all neighbors of symbol 1. It may be noted that $h_n=[h_{n,1} \ h_{n,2} \ldots h_{n,N_t}]$ be nth row of H. $h_{n,2} x_2^{best} + \ldots + h_{n,N_t} x_{N_t}^{best}$ is calculated only once. Note that in this example, the first layer was being processed, and in the general case, for processing layer d, we have $$\tilde{y}_n = h_{n,d} x_{neighbour,d,i} + \sum_{j=1, j\neq d}^{N_t} h_{n,j} x_j^{best},$$

where $$\sum_{j=1, j\neq d}^{N_t} h_{n,j} x_j^{best}$$

is calculated only once.

Figure 7:
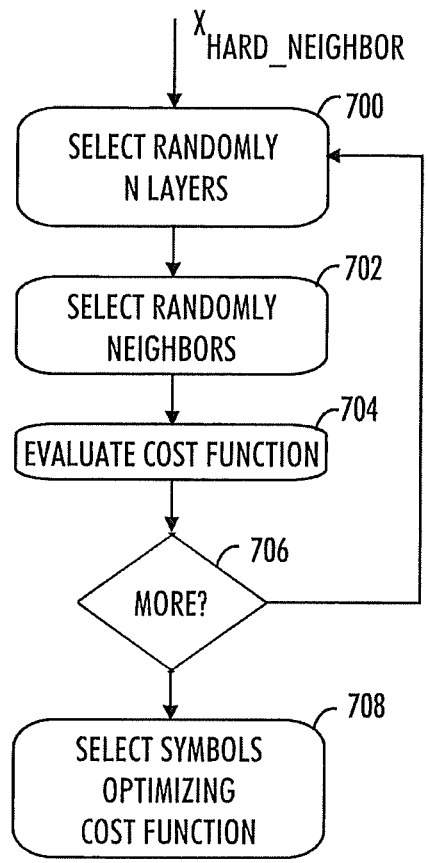

FIG. 7 illustrate an example of randomized joint neighbor search. This may, for example, be applied as a third stage in receiving apparatus. Input to the example of FIG. 7 is the hard symbols $x_{HARD\_NEIGHBOR}$ obtained from an earlier stage, such as the stage of illustrated in FIG. 6, for example. Other stage structures are naturally also possible as earlier stages.

In step 700, the apparatus is configured to select randomly a given number N layers for processing.

In step 702, the apparatus is configured to select randomly a given number of neighbors for the hard decision of each selected layer.

In step 704, the apparatus is configured to evaluate a given cost function.

In step 706, the apparatus is configured to determine whether enough iterations have been made. The number of iterations maybe a design parameter. If more iterations can be made, the process continues at step 700.

Otherwise, in step 708, the apparatus is configured to select symbols which optimize the cost function.

The proposed solution has a controllable complexity. The complexity is higher than with MMSE method alone, but the achieved performance is better. In some cases, a considerable gain can be achieved with eight evaluations of the cost function. For a better performance, the number of iterations can be increased. This is especially useful for high ranks. The proposed solution does not require feedback from LDPC/Polar decoder and it is is independent of the coding method and number of codewords, for example. Complexity does not depend on the modulation, only on the parameters $N_t$, $N_{iter}$ and $N_{neighbor}$.

The proposed solution has small latency since feedback from decoder is not needed.

It may be noted that if complexity allows, it is possible to "combine" two or more layers, and search for a joint decision. For example, in the case of 3×3, and joint decision is done over 2 layers, the number of cost function evaluations is 1+8²+8, in the case of 8 neighbors.

Complexity may be adjusted by applying different set of neighbors depending on SINR of the layer and/or iteration number.

Figure 8:
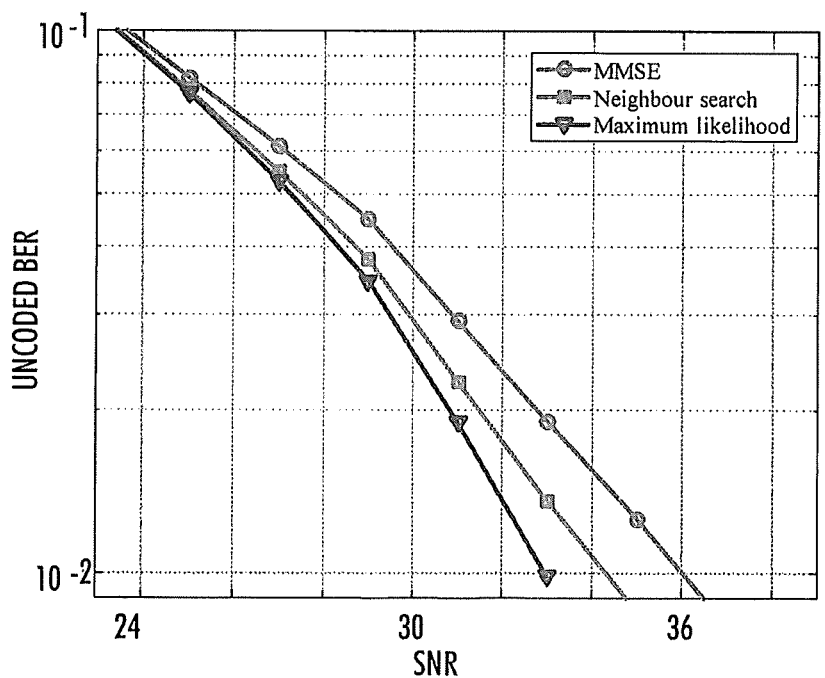
FIGS. 8 and 9 illustrate examples of simulations.
Figure 9:
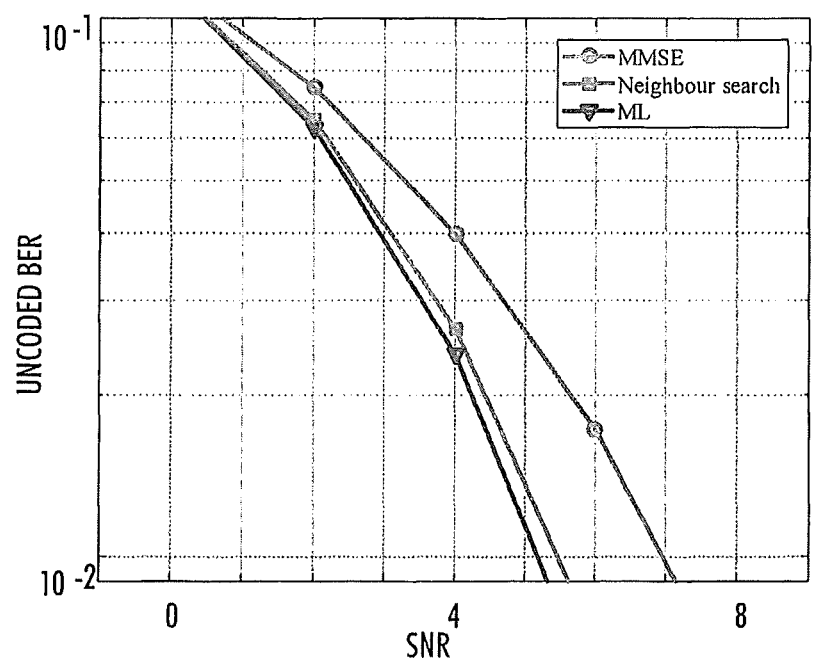

FIGS. 8 and 9 illustrate simulation results. FIG. 8 illustrates 256-QAM 2×2. FIG. 9 illustrates QPSK 8×16. The figures illustrate the performance of MMSE, the proposed solution with two iterations and 8 neighbors and Maximum likelihood method, which may be considered as optimal. The simulations show that considerable gain over MMSE is achieved in both cases, sometimes close to the optimal.

Figure 10A:
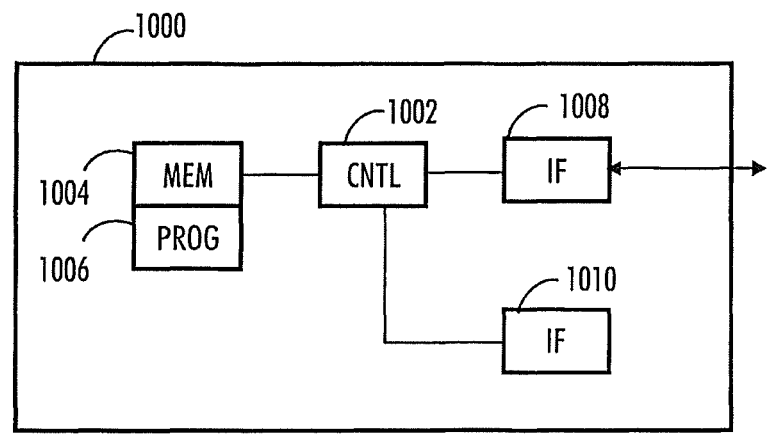

FIGS. 10A, 10B and 10C illustrate embodiments. The figures illustrate simplified examples of an apparatus applying embodiments of the invention. In some embodiments, the apparatus may be a base station (gNodeB) or a part of a base station. In some embodiments, the apparatus may be a user terminal or a part of a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 1000 of the example includes a control circuitry 1002 configured to control at least part of the operation of the apparatus.

The apparatus may comprise a memory 1004 for storing data. Furthermore the memory may store software 1006 executable by the control circuitry 1002. The memory may be integrated in the control circuitry.

The apparatus may comprise one or more interface circuitries 1008, 1010. One of the interfaces may be a transceiver 1008 configured to communicate wirelessly with other apparatuses of a communication system. The transceiver may be connected to an antenna arrangement (not shown). If the apparatus is a base station or a part of a base station one of the interfaces 1010 may connect the apparatus to other network elements of the communication system. The interface may provide a wired or wireless connection to the communication system. If the apparatus is a user terminal or a part of a user terminal, the interface 1010 may be user interface. The interfaces may be operationally connected to the control circuitry 1002.

The software 1006 may comprise a computer program comprising program code means adapted to cause the control circuitry 1002 of the apparatus to control the apparatus to perform the embodiments described above and in the claims.

If the apparatus is a base station or a part of a base station, in an embodiment as shown in FIG. 10B, at least some of the functionalities of the apparatus of FIG. 10A may be shared between two physically separate devices, forming one operational entity. Therefore, the apparatus may be seen to depict the operational entity comprising one or more physically separate devices for executing at least some of the described processes. Thus, the apparatus of FIG. 10B, utilizing such shared architecture, may comprise a remote control unit RCU 1020, such as a host computer or a server computer, operatively coupled (e.g. via a wireless or wired network) to a remote radio head RRH 1022 located in the base station. In an embodiment, at least some of the described processes may be performed by the RCU 1020. In an embodiment, the execution of at least some of the described processes may be shared among the RRH 1022 and the RCU 1020.

In an embodiment, the RCU 1020 may generate a virtual network through which the RCU 1020 communicates with the RRH 1022. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

FIG. 10C illustrate an example embodiment. The figure illustrates a simplified example of an apparatus applying embodiments of the invention.

The apparatus comprises radio frequency, RF, units 1100A, 1100B, 1100C which receive a signal. The RF units may comprise downconversion and filtering the received signal. The received signal is taken to digital front ends, DFE, 1102A, 1102B, 1102C where the signal maybe converted to a digital form and digitally filtered. Next the signal is taken to Fast Fourier Transform, FFT, units. The transformed signal is taken to channel estimation 1106 providing an estimate of the channel the signal has gone through, for example utilizing reference symbols contained in the signal. The transformed signal is also taken to the first stage of the receiver 1108, which may be typically a MMSE, or ZF receiver, or some other low complexity receiver, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising
  at least one processor;
  at least one memory including computer program code;
  the at least one memory and the computer program code configured to, with the at least one processor, cause the apparatus at least to perform:
  storing for a given number of modulation methods, for each modulation symbol, information on neighboring symbols in the symbol constellation of the modulation method,
  receiving as an input a Multiple Input Multiple Output signal comprising modulation symbols in two or more layers;
  providing hard decisions of the modulation symbols for each layer of the two or more layers;
  determining neighbors for the hard decision;
  for each hard decision of a layer of the two or more layers, going through at least some of the neighbors, evaluating a cost function and selecting a symbol based on the evaluation and repeating this for each layer of the two or more layers characterized by utilizing $\Omega(x)=\|y-\tilde{y}\|^2$ as the cost function, where y is a received symbol vector, and $$\tilde{y}_n = h_{n,d}x_{neighbour,d,i} + \sum_{j=1, j\neq d}^{N_t} h_{n,j}x_j^{best},$$

where $\tilde{y}_n$ is n:th element of vector $\tilde{y}$, $h_{n,j}$ is j:th element on nth row of channel matrix H, d is a layer of the two or more layers to be processed, $x_{neighbour,d,i}$ is a neighbor of the hard decision symbol of the layer d of the two or more layers and i is the index of the ith neighbor of symbol.

2. The apparatus of claim 1, the at least one memory and the computer program code configured to, with the at least one processor, cause the apparatus further to perform:
while processing a layer of the two or more layers, fixing the other layers of the two or more layers to hard decisions.

3. The apparatus of claim 1, the at least one memory and the computer program code configured to, with the at least one processor, cause the apparatus further to perform:
perform one or more iterations where, for each layer of the two or more layers, the cost function for the neighbors of the symbols selected in the previous iteration are evaluated, and symbols of the other layers of the two or more layers are fixed to the symbols selected in the previous iteration.

4. The apparatus of claim 1, the at least one memory and the computer program code configured to, with the at least one processor, cause the apparatus further to perform:
limit the number of neighbors to a given amount.

5. The apparatus of claim 1, the at least one memory and the computer program code configured to, with the at least one processor, cause the apparatus further to perform:
determine signal to noise ratio to each layer of the two or more layers;
process the layers of the two or more layers starting from the layer of the two or more layers having the weakest signal to noise ratio towards the layer of the two or more layers having the best signal to noise ratio.

6. The apparatus of claim 1, the at least one memory and the computer program code configured to, with the at least one processor, cause the apparatus further to perform:
limit the number of layers of the two or more layers to a given amount smaller than the total number of layers of the two or more layers.

7. The apparatus of claim 1, the at least one memory and the computer program code configured to, with the at least one processor, cause the apparatus further to perform:
while processing a layer of the two or more layers, fixing already processed layers of the two or more layers to selected symbols and unprocessed layers of the two or more layers to hard decisions.

8. A method in a communication system, comprising:
storing for a given number of modulation methods, for each modulation symbol, information on neighboring symbols in the symbol constellation of the modulation method, receiving as an input a Multiple Input Multiple Output signal comprising modulation symbols in two or more layers;
providing hard decisions of the modulation symbols for each layer of the two or more layers;
determining neighbors for the hard decision;
for each hard decision of a layer of the two or more layers, going through at least some of the neighbors, evaluating a cost function and selecting a symbol based on the evaluation and repeating this for each layer of the two or more layers characterized by
utilizing $\Omega(x)=\|y-\tilde{y}\|^2$ as the cost function, where y is a received symbol vector, and $$\tilde{y}_n = h_{n,d}x_{neighbour,d,i} + \sum_{j=1, j\neq d}^{N_t} h_{n,j}x_j^{best},$$

where $\tilde{y}_n$ is n:th element of vector $\tilde{y}$, $h_{n,j}$ is j:th element on nth row of channel matrix H, d is a layer of the two or more layers to be processed, $x_{neighbour,d,i}$ is a neighbor of the hard decision symbol of the layer d of the two or more layers and i is the index of the ith neighbor of symbol.

9. The method of claim 8, further comprising:
while processing a layer of the two or more layers, fixing the other layers of the two or more layers to hard decisions.

10. The method of claim 8, further comprising:
performing one or more iterations where, for each layer of the two or more layers, the cost function for the neighbors of the symbols selected in the previous iteration are evaluated, and symbols of the other layers of the two or more layers are fixed to the symbols selected in the previous iteration.

11. The method of claim 8, further comprising:
limiting the number of neighbors to a given amount.

12. The method of claim 8, further comprising:
determining signal to noise ratio to each layer of the two or more layers;
processing the layers of the two or more layers starting from the layer of the two or more layers having the weakest signal to noise ratio towards the layer of the two or more layers having the best signal to noise ratio.

13. The method of claim 8, further comprising:
limiting the number of layers of the two or more layers to a given amount smaller than the total number of layers of the two or more layers.

14. The method of claim 8, further comprising:
while processing a layer of the two or more layers, fixing already processed layers of the two or more layers to selected symbols and unprocessed layers of the two or more layers to hard decisions.

15. A computer program tangibly stored on a non-transitory computer readable storage medium and comprising instructions for causing an apparatus of a communication system to perform the method steps of claim 8.

* * * * *